United States Patent
Joye et al.

(10) Patent No.: US 10,411,891 B2
(45) Date of Patent: Sep. 10, 2019

(54) DISTANCE-REVEALING ENCRYPTION

(71) Applicant: NXP B.V., Eindhoven (NL)

(72) Inventors: Marc Joye, Palo Alto, CA (US); Yan Michalevsky, Palo Alto, CA (US)

(73) Assignee: NXP B.V., Eindhoven (NL)

( * ) Notice: Subject to any disclaimer, the term of this patent is extended or adjusted under 35 U.S.C. 154(b) by 120 days.

(21) Appl. No.: 15/636,412

(22) Filed: Jun. 28, 2017

(65) Prior Publication Data

US 2019/0007210 A1  Jan. 3, 2019

(51) Int. Cl.
*H04L 9/30* (2006.01)
*H04L 29/06* (2006.01)
*H04L 29/08* (2006.01)
*H04L 9/06* (2006.01)
*H04L 9/32* (2006.01)
*H04L 9/08* (2006.01)

(52) U.S. Cl.
CPC .......... *H04L 9/3073* (2013.01); *H04L 9/0618* (2013.01); *H04L 9/0662* (2013.01); *H04L 9/0869* (2013.01); *H04L 9/3263* (2013.01)

(58) Field of Classification Search
CPC ....... G09C 5/00; H04L 9/0618; H04L 9/0662; H04L 9/0869; H04L 9/3073; H04L 9/3263
See application file for complete search history.

(56) References Cited

U.S. PATENT DOCUMENTS

| | | | | |
|---|---|---|---|---|
| 7,337,322 B2* | 2/2008 | Gentry | .......... | H04L 9/0836 380/28 |
| 7,653,817 B2* | 1/2010 | Gentry | .......... | H04L 9/3073 713/176 |
| 7,796,751 B2* | 9/2010 | Gentry | .......... | H04L 9/0836 380/30 |
| 7,970,141 B2* | 6/2011 | Boneh | .......... | G09C 5/00 380/277 |
| 8,515,060 B2* | 8/2013 | Fujisaki | .......... | H04L 9/0825 380/28 |
| 8,897,442 B2* | 11/2014 | Fujisaki | .......... | H04L 9/0836 380/44 |
| 8,898,478 B2 | 11/2014 | Sun | | |
| 2005/0002532 A1* | 1/2005 | Zhou | .......... | H04L 9/302 380/277 |
| 2008/0075287 A1* | 3/2008 | Boneh | .......... | G09C 5/00 380/277 |
| 2017/0063528 A1* | 3/2017 | Seo | .......... | H04L 9/0618 |

FOREIGN PATENT DOCUMENTS

EP   3002904 A1   4/2016

OTHER PUBLICATIONS

Boneh et al., Functional encryption:Definitions and challenges. 8th Theory of Cryptography Conference, vol. 6597, Lect.Notes—CompSci., pp. 253-271 Mar. 2011.
Boneh et al., Semantically secure order-revealing encryption: Multi-input functional encryption without obfuscation, EUROCRYPT 2015, vol. 9057,Lect.Notes—CompSci., pp. 563-594.

(Continued)

*Primary Examiner* — Kendall Dolly
*Assistant Examiner* — Jen-Shi Huang

(57) ABSTRACT

A method for computing the distance between two encrypted data vectors using elliptic curve cryptography.

16 Claims, 1 Drawing Sheet

(56) References Cited

OTHER PUBLICATIONS

Goldwasser et al., Multi-input functional encryption, Advances in Cryptology-EUROCRYPT 2014, vol. 8441,Lect.Notes—Comp. Sci., pp. 578-602.

Belkin, Mikhail et al; "Laplacian Eigenmaps for Dimensionality Reduction and Data Representation"; Neural Computation 15; pp. 1373-1396 (Jun. 2003); Massachusetts Institute of Technology.

Coifman, Ronald R. et al; "Diffusion Maps"; Applied and Computational Harmonic Analysis; vol. 21, Issue 1; (Jul. 2006); pp. 5-30; 26 pages (Accepted Apr. 2, 2006); doi: 10.1016/j.acha.2006.04.006.

Kim, Sam et al., "Function-Hiding Inner Product Encryption is Practical", International Association for Cryptologic Research, May 7, 2016, pp. 1-33, vol. 20160507:001353, Springer, New York, USA.

Mika, Sebastian et al; "Kernel PCA and De-Noising in Feature Spaces"; Proceedings of the 1998 Conference on Advances in Neural Information Processing Systems II (NIPS), vol. 11; pp. 536-542 (1999).

Roweis, Sam T. et al; "Nonlinear Dimensionality Reduction by Locally Linear Embedding"; Science, vol. 290. Issue; 5500; pp. 2323-2326 (Dec. 22, 2000).

Unagami, Yuji et al., "Private Similarity Searchable Encryption for Euclidean Distance", 2016 International Symposium on Information Theory and Its Applications (ISITA), Oct. 30, 2016, pp. 718-722; Monterey, CA, USA.

\* cited by examiner

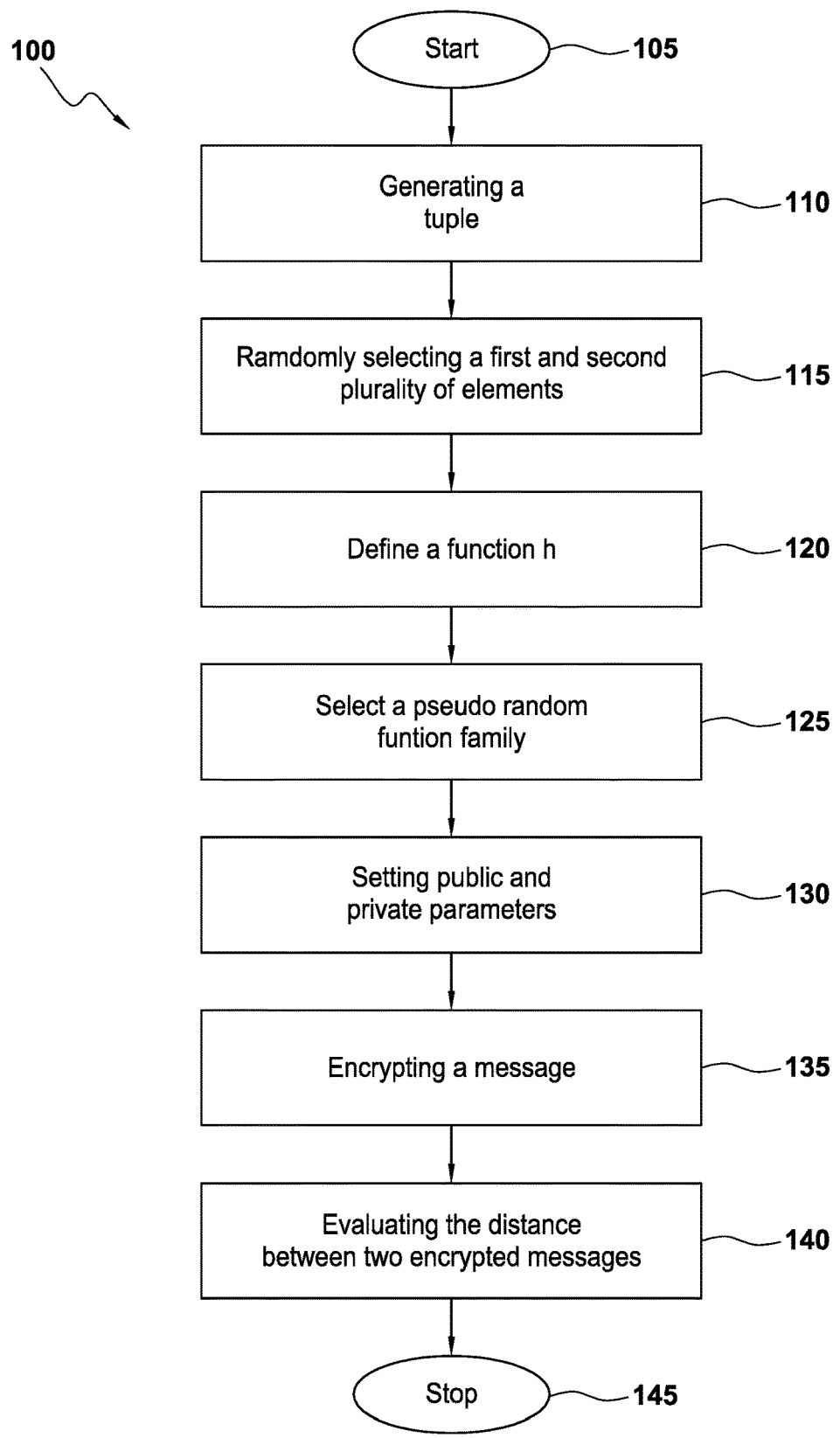

DISTANCE-REVEALING ENCRYPTION

TECHNICAL FIELD

Various exemplary embodiments disclosed herein relate generally to distance-revealing encryption.

BACKGROUND

Distance-revealing encryption is a primitive related to functional encryption (FE), a generalization of public-key encryption which allows a party to learn a function of the input plaintext (or multiple plaintexts in the case of multi-input functional encryption (MIFE)). More specifically, distance-revealing encryption adds the useful feature that given any two ciphertexts, the Euclidean distance between the corresponding plaintexts—viewed as vectors—can be evaluated publicly; that is, without the knowledge of the private decryption key.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to method for performing distance revealing encryption, including: generating a tuple $(\mathbb{G}_1, \mathbb{G}_2, \mathbb{G}_T, \hat{e})$, where $\mathbb{G}_1 = \langle g_1 \rangle$, $\mathbb{G}_2 = \langle g_2 \rangle$ and $\mathbb{G}_T$ are groups whose order is $|\mathbb{G}_1| = |\mathbb{G}_2| = |\mathbb{G}_T| = p$ with p prime and $\hat{e}: \mathbb{G}_1 \times \mathbb{G}_2 \rightarrow \mathbb{G}_T$ is a bilinear pairing and is non-degenerate; randomly select a first plurality elements and a second plurality of elements; defining a parameter h that is based upon $\hat{e}, g_1, g_2$, and the first plurality of elements; selecting a pseudo-random function family indexed by a secret key K; setting public parameters as $\hat{e}, \mathbb{G}_1, \mathbb{G}_2, \mathbb{G}_T, p, h$; setting private parameters as $g_1$, $g_2$, the first plurality of elements, the second plurality of elements, the pseudo-random function family, and the secret key K; encrypting a message $\vec{x} = (x_1, \ldots, x_n)$, when n is the number of components in the message by:

choosing a random value r; computing a plurality of values of the pseudo random function; and computing a first plurality of ciphertext values based upon $g_1$, the random value r, the first plurality of elements, the second plurality of elements, the plurality of values of the pseudo random function, and message $\vec{x}$; and computing a second plurality of ciphertext values based upon $g_2$, the random value r, the first plurality of elements, the second plurality of elements, the plurality of values of the pseudo random function, and message $\vec{x}$.

Further various embodiments relate to a non-transitory machine-readable storage medium encoded with instructions for execution by a processor for performing distance revealing encryption, including: instructions for generating a tuple $\mathbb{G}_1, \mathbb{G}_2, \mathbb{G}_T, \hat{e}$, where $\mathbb{G}_1 = \langle g_1 \rangle$, $\mathbb{G}_2 = \langle g_2 \rangle$ and $\mathbb{G}_T$ are groups whose order is $|\mathbb{G}_1| = |\mathbb{G}_2| = |\mathbb{G}_T| = p$ with p prime and $\hat{e}: \mathbb{G}_1 \times \mathbb{G}_2 \rightarrow \mathbb{G}_T$ is a bilinear pairing and is non-degenerate; instructions for randomly select a first plurality elements and a second plurality of elements; instructions for defining a parameter h that is based upon $\hat{e}, g_1, g_2$, and the first plurality of elements; instructions for selecting a pseudo-random function family indexed by a secret key K; instructions for setting public parameters as $\hat{e}, \mathbb{G}_1, \mathbb{G}_2, \mathbb{G}_T, p, h$; instructions for setting private parameters as $g_1$, $g_2$, the first plurality of elements, the second plurality of elements, the pseudo-random function family, and the secret hey K; instructions for encrypting a message $\vec{x} = (x_1, \ldots, x_n)$, when n is the number of components in the message by: choosing a random value r; computing a plurality of values of the pseudo random function; and computing a first plurality of ciphertext values based upon $g_1$, the random value r, the first plurality of elements, the second plurality of elements, the plurality of values of the pseudo random function, and message $\vec{x}$; and computing a second plurality of ciphertext values based upon $g_2$, random value r, the first plurality of elements, the second plurality of elements, the plurality of values of the pseudo random function, and message $\vec{x}$.

Various embodiments are described, wherein the first plurality of elements are $\alpha, \beta, \xi, \eta$ and are selected such that $(\alpha + \beta)\xi\eta \not\equiv 0 \pmod{p}$, and the second plurality of elements are $\mu_1, \ldots, \mu_n$ and are selected such that $\sum_{i=1}^{n} \mu_i^2 \equiv 0 \pmod{p}$.

Various embodiments are described, wherein the parameter $h = \hat{e}(b_1, g_2)^{(\alpha+\beta)\xi\eta}$.

Various embodiments are described, wherein the first plurality of ciphertext values are calculated as $c_{i,1} = g_1^{\xi(x_i + t_i) + r\mu_i}$ and $c_{i,2} = g_1^{\alpha\xi(x_i + t_i) - \beta r\mu_i}$ for $1 \leq i \leq n$, where $t_i$ are the plurality of values of the pseudo random function, and the second plurality of ciphertext values are calculated as $d_{i,1} = g_2^{\beta\eta(x_i + t_i) - \alpha r\mu_i}$ and $d_{i,2} = g_2^{\eta(x_i + t_i) + r\mu_i}$ for $1 \leq i \leq n$.

Various embodiments are described, wherein $t_i = F_K(\tau, i)$ where tag $\tau$ is a value associated with the message $\vec{x}$.

Various embodiments are described, further including determining the distance between two encrypted messages $\vec{x}$ and $\vec{x}'$ by calculating:

$$Z := \prod_{i=1}^{n} \hat{e}\left(\frac{c_{i,1}}{c'_{i,1}}, \frac{d_{i,1}}{d'_{i,1}}\right) \cdot \hat{e}\left(\frac{c_{i,2}}{c'_{i,2}}, \frac{d_{i,2}}{d'_{i,2}}\right).$$

Further various embodiments relate to a method for performing distance revealing encryption, including: generating a tuple $(\mathbb{G}, \mathbb{G}_T, \hat{e})$, where $\mathbb{G} = \langle g \rangle$ and $\mathbb{G}_T$ are groups whose order is $|\mathbb{G}| = |\mathbb{G}_T| = p$ with p prime and $\hat{e}: \mathbb{G} \times \mathbb{G} \rightarrow \mathbb{G}_T$ is a bilinear pairing and is non-degenerate; randomly select a first plurality elements and a second plurality of elements; defining a parameter h that is based upon $\hat{e}, \mathbb{G}$ and the first plurality of elements; selecting a pseudo-random function family indexed by a secret key K; setting public parameters as $\hat{e}, \mathbb{G}, \mathbb{G}_T, p, h$, setting private parameters as g, the first plurality of elements the second plurality of elements, the pseudo-random function family, and the secret key K; encrypting a message $\vec{x} = (x_1, \ldots, x_n)$, when n is the number of elements in the message by: choosing a random value r; computing a plurality of values of the pseudo random function; and computing a plurality of ciphertext values based upon g, the random value r, the first plurality of elements, the second plurality of elements, the plurality of values of the pseudo random function, and message $\vec{x}$.

Further various embodiments relate to a non-transitory machine-readable storage medium encoded with instructions for execution by a processor for performing distance revealing encryption, including: instructions for generating a tuple $(\mathbb{G}, \mathbb{G}_T, \hat{e})$, where $\mathbb{G} = \langle g \rangle$ and $\mathbb{G}_T$ are groups whose order is $|\mathbb{G}| = |\mathbb{G}_T| = p$ with p prime and $\hat{e}: \mathbb{G} \times \mathbb{G} \rightarrow \mathbb{G}_T$ is a bilinear pairing and is non-degenerate; instructions for randomly select a first plurality elements and a second plurality of elements; instructions for defining a parameter h that is based upon ê, g, and the first plurality of elements; instructions for selecting a pseudo-random function family indexed by a secret key K; instructions for setting public parameters as ê, $\mathbb{G}$, $\mathbb{G}_T$, p, h, instructions for setting private parameters as g, the first plurality of elements, the second plurality of elements, the pseudo-random function family, and the secret key K; instructions for encrypting a message $\vec{x}=(x_1, \ldots, x_n)$, when n is the number of elements in the message by: choosing a random value r; computing a plurality of values of the pseudo random function; and computing a plurality of ciphertext values based upon g, the random value r, the first plurality of elements, the second plurality of elements, the plurality of values of the pseudo random function, and message $\vec{x}$.

Various embodiments are described, wherein the first plurality of elements are $\alpha, \beta, \xi, \eta$ and are selected such that $(\alpha+\beta)\xi\eta \not\equiv 0 \pmod{p}$, and the second plurality of elements are $\mu_1, \ldots, \mu_n$ and are selected such that $\Sigma_{i=1}^{n} \mu_i^2 \equiv 0 \pmod{p}$.

Various embodiments are described, wherein the parameter $h=\hat{e}(g_1, g_2)^{(\alpha+\beta)\xi\eta}$.

Various embodiments are described, wherein the first plurality of ciphertext values are calculated as $c_{i,1}=g_1^{\xi(x_i+t_i)+r\mu_i}$ and $c_{i,2}=g_1^{\alpha\xi(x_i+t_i)-\beta r\mu_i}$ for $1 \leq i \leq n$, where $t_i$ are the plurality of values of the pseudo random function, and the second plurality of ciphertext values are calculated as $d_{i,1}=g_2^{\beta\eta(x_i+t_i)-\alpha r\mu_i}$ and $d_{i,2}=g_2^{\eta(x_i+t_i)+r\mu_i}$ for $1 \leq i \leq n$.

Various embodiments are described, wherein $t_i = F_K(\tau, i)$ where tag $\tau$ is a value associated with the message $\vec{x}$.

Various embodiments are described, further including determining the distance between two encrypted messages $\vec{x}$ and $\vec{x}'$ by calculating:

$$Z := \prod_{i=1}^{n} \hat{e}\left(\frac{c_{i,1}}{c'_{i,1}}, \frac{d_{i,1}}{d'_{i,1}}\right) \cdot \hat{e}\left(\frac{c_{i,2}}{c'_{i,2}}, \frac{d_{i,2}}{d'_{i,2}}\right).$$

BRIEF DESCRIPTION OF THE DRAWINGS

In order to better understand various exemplary embodiments, reference is made to the accompanying drawings, wherein:

FIG. 1 illustrates a flow diagram of the distance-revealing encryption method.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Two embodiments of distance-revealing encryption schemes are described below. These schemes make use of non-degenerate bilinear maps. Those maps may be constructed from pairings over elliptic curves. These two embodiments provide for a secure and computationally efficient method for encrypting data that can then be processed to determine the distance between two data points from their encrypted values, without ever decrypting.

There are two forms of bilinear maps commonly used in the cryptography literature. The first are of the form $\hat{e}: \mathbb{G}_1 \times \mathbb{G}_2 \to \mathbb{G}_T$, where $\mathbb{G}_1$, $\mathbb{G}_2$ and $\mathbb{G}_T$ are cyclic groups of prime order p. The second are of the form $\hat{e}: \mathbb{G} \times \mathbb{G} \to \mathbb{G}_T$ where $\mathbb{G}$ and $\mathbb{G}_T$ are cyclic groups of prime order p.

The second form can be seen as a particular case of the first one by setting $\mathbb{G}_1 = \mathbb{G}_2 = \mathbb{G}$. Embodiments using both forms are described. The different groups will be written multiplicatively with identity element 1.

Let $\mathbb{G}_1 = \langle g_1 \rangle$ and $\mathbb{G}_2 = \langle g_2 \rangle$. Two properties of map $\hat{e}$ are important: 1) bilinearity for any a, $b \in \mathbb{Z}_p$, $\hat{e}(g_1^a, g_2^b) = \hat{e}(g_1, g_2)$ and 2) non-degeneracy $\hat{e}(g_1, g_2) \neq 1$.

The non-degeneracy property implies that $\hat{e}(g_1, g_2)$ is a generator of the target group; that is, $\mathbb{G}_T = \langle \hat{e}(g_1, g_2) \rangle$.

By construction, a good encryption scheme should be such that its output is uniformly distributed over the ciphertext space. Assume the message space is the set of n-dimension vectors whose components are l-bit strings, $\mathcal{M} = (\{0, 1\}^l)^n$. Consider also a pseudo-random function family, $F_K: \{0,1\}^* \times \{0,1\}^n \to \mathbb{Z}_p$, indexed by a secret key K. A simple construction for distance-revealing encryption could be as follows: given a message $\vec{x} = (x_1, \ldots, x_n) \in \mathcal{M}$ with tag $\tau$, its encryption is given by $\mathfrak{C} = (c_1, \ldots, c_n)$ where $$c_i = [F_K(\tau, i) + x_i] \bmod p.$$

Then the (square of) distance between any two plaintexts, given their ciphertexts $\mathfrak{C} = (c_1, \ldots, c_n)$ and $\mathfrak{C}' = (c'_1, \ldots, c'_n)$, can be obtained as:

$$\|\vec{x} - \vec{x}'\|^2 = \sum_{i=1}^{n} (c_i - c'_i)^2 \pmod{p}.$$

While this encryption scheme is very efficient, this encryption scheme leaks to much information. In particular, it provides the difference between any two components of plaintexts; namely, $c_i - c'_i = x_i - x'_i \pmod{p}$ for any $i \in \{1, \ldots, n\}$. In turn, this implies that the knowledge of a single pair of plaintext/ciphertext allows one to decrypt any ciphertext.

FIG. 1 illustrates a flow diagram of a distance revealing encryption method. The method 100 begins at 105. Next, a tuple including specific points and a mapping function is generated 110. The method 100 then randomly selects a first and second plurality of elements 115. Next, the method 100 defines a parameter h based upon the generated tuple 120. The method 110 then selects a pseudo random function family 125. Next, the method 100 sets the public and private parameters 130, which are essentially a public and private key. The method 100 then encrypts a message 135. Finally, the method 100 evaluates the distance between two encrypted messages 140. The method 100 then ends at 145. Further, details for the two embodiments will be provided below.

Embodiments will now be described that aim at providing solutions so that only the distance between plaintexts can be inferred from the ciphertexts. Two schemes are proposed. The first one makes use of asymmetric pairings and the second one of symmetric pairings.

The first scheme may be described by the following steps.

First, define a Setup $(1^K,n)$ algorithm. The value n indicates the number of components in the message (viewed as a vector of dimension n) to be encrypted. On the input security parameter $1^K$, the Setup $(1^K,n)$ algorithm generates the tuple $(\mathbb{G}_1, \mathbb{G}_2, \mathbb{G}_T, \hat{e})$ where $\mathbb{G}_1=\langle g_1 \rangle$, $\mathbb{G}_2=\langle g_2 \rangle$ and $\mathbb{G}_T$ are (multiplicatively written) groups whose order is $|\mathbb{G}_1|=|\mathbb{G}_2|=|\mathbb{G}_T|=p$ with p prime, and $\hat{e}: \mathbb{G}_1 \times \mathbb{G}_2 \to \mathbb{G}_T$ is a bilinear pairing. The message space $\mathcal{M}$ is a subset of $(\mathbb{Z}_p)^n$; for example, $\mathcal{M}=(\{0,1\}^{l-1})^n$ where l denotes the bit-length of p. The Setup $(1^K,n)$ algorithm also selects n+4 elements $\alpha,\beta,\xi,\eta,\mu_1,\ldots,\mu_n \in \mathbb{Z}_p$ such that:

$$(\alpha+\beta)\xi\eta \not\equiv 0 \pmod{p}; \text{ and}$$

$$\Sigma_{i=1}^n \mu_i^2 \equiv 0 \pmod{p}.$$

Next, the Setup $(1^K,n)$ algorithm defines $h=\hat{e}(g_1,g_2)^{(\alpha+\beta)\xi\eta} \in \mathbb{G}_T$. Finally, the Setup $(1^K,n)$ algorithm selects a pseudo-random function family, $F_K:\{0,1\}^* \times \{1,\ldots,n\} \to \mathbb{Z}_p$, indexed by a secret key and randomly chooses $$K \xleftarrow{\$} KeyGen(1^K).$$

The public parameters are $pp=(\hat{e}, \mathbb{G}_1, \mathbb{G}_2, \mathbb{G}_T, p, h)$ and the secret key is $sk=(g_1,g_2,\alpha,\beta,\xi,\eta,\{\mu_i\}_{1 \leq i \leq n}, F_K, K)$. This is public key and the private key.

Next, define an Enc $(sk, \vec{x}, \tau)$ algorithm. The encryption of message $\vec{x}=(x_1,\ldots,x_n) \in \mathcal{M}$ with tag $\tau$ (which is an identifier associated with the message) is obtained by performing the following two steps:

1) choose uniformly at random $$r \xleftarrow{\$} \mathbb{Z}_p;$$

and 2) for $1 \leq i \leq n$, compute $t_i = F_K(\tau, i)$ and $$\begin{cases} c_{i,1} = g_1^{\xi(x_i+t_i)+r\mu_i}, & c_{i,2} = g_1^{\alpha\xi(x_i+t_i)-\beta r\mu_i}, \\ d_{i,1} = g_2^{\beta\eta(x_i+t_i)-\alpha r\mu_i}, & d_{i,2} = g_2^{\eta(x_i+t_i)+r\mu_i}. \end{cases}$$

The ciphertext is $\mathfrak{C}=(C,D,\tau)$ with $C=(c_{1,1}, c_{1,2}, \ldots, c_{n,1}, c_{n,2}) \in (\mathbb{G}_1)^{2n}$ and $D=(d_{1,1}, d_{1,2}, \ldots, d_{n,1}, d_{n,2}) \in (\mathbb{G}_2)^{2n}$.

Finally, define an Eval $(pp, \mathfrak{C}, \mathfrak{C}')$ algorithm. The Eval $(pp, \mathfrak{C}, \mathfrak{C}')$ algorithm parses $\mathfrak{C}$ as $$((c_{1,1}, c_{1,2}, \ldots, c_{n,1}, c_{n,2}), (d_{1,1}, d_{1,2}, \ldots, d_{n,1}, d_{n,2}), \tau)$$

and $\mathfrak{C}'$ as $$((c'_{1,1}, c'_{1,2}, \ldots, c'_{n,1}, c'_{n,2}), (d'_{1,1}, d'_{1,2}, \ldots, d'_{n,1}, d'_{n,2}), \tau').$$

If $\tau' \neq \tau$, the Eval $(pp, \mathfrak{C}, \mathfrak{C}')$ algorithm returns $\perp$. Otherwise, if $\tau'=\tau$, the Eval $(pp, \mathfrak{C}, \mathfrak{C}')$ algorithm evaluates the product $$Z := \prod_{i=1}^n \hat{e}\left(\frac{c_{i,1}}{c'_{i,1}}, \frac{d_{i,1}}{d'_{i,1}}\right) \cdot \hat{e}\left(\frac{c_{i,2}}{c'_{i,2}}, \frac{d_{i,2}}{d'_{i,2}}\right)$$

$$= h^{\sum_{i=1}^n (x_i-x'_i)^2}.$$

The Eval $(pp, \mathfrak{C}, \mathfrak{C}')$ algorithm then obtains $\Sigma_{i=1}^n(x_i-x'_i)^2 \pmod{p}$ as the discrete logarithm of Z with respect to base h in $\mathbb{G}_T$.

The correctness of the Eval $(pp, \mathfrak{C}, \mathfrak{C}')$ algorithm is easily verified. From $$\begin{cases} \frac{c_{i,1}}{c'_{i,1}} = g_1^{\xi(x_i-x'_i)+(r-r')\mu_i}, & \frac{c_{i,2}}{c'_{i,2}} = g_1^{\alpha\xi(x_i-x'_i)-\beta(r-r')\mu_i}, \\ \frac{d_{i,1}}{d'_{i,1}} = g_2^{\beta\eta(x_i-x'_i)-\alpha(r-r')\mu_i}, & \frac{d_{i,2}}{d'_{i,2}} = g_2^{\eta(x_i-x'_i)+(r-r')\mu_i}, \end{cases}$$

the following results:

$$\hat{e}\left(\frac{c_{i,1}}{c'_{i,1}}, \frac{d_{i,1}}{d'_{i,1}}\right) \cdot \hat{e}\left(\frac{c_{i,2}}{c'_{i,2}}, \frac{d_{i,2}}{d'_{i,2}}\right) = \hat{e}\left(g_1^{\xi(x_i-x'_i)+(r-r')\mu_i}, g_2^{\beta\eta(x_i-x'_i)-\alpha(r-r')\mu_i}\right) \cdot \hat{e}\left(g_1^{\alpha\xi(x_i-x'_i)-\beta(r-r')\mu_i}, g_2^{\eta(x_i-x'_i)+(r-r')\mu_i}\right)$$

$$= \hat{e}(g_1, g_2)^{(\xi(x_i-x'_i)+(r-r')\mu_i)(\beta\eta(x_i-x'_i)-\alpha(r-r')\mu_i)+(\alpha\xi(x_i-x'_i)-\beta(r-r')\mu_i)(\eta(x_i-x'_i)+(r-r')\mu_i)}$$

$$= \hat{e}(g_1, g_2)^{(\alpha+\beta)\xi\eta(x_i-x'_i)^2-(\alpha+\beta)(r-r')^2\mu_i^2}.$$

As a result, the following is obtained:

$$Z := \prod_{i=1}^n \hat{e}\left(\frac{c_{i,1}}{c'_{i,1}}, \frac{d_{i,1}}{d'_{i,1}}\right) \cdot \hat{e}\left(\frac{c_{i,2}}{c'_{i,2}}, \frac{d_{i,2}}{d'_{i,2}}\right)$$

$$= \prod_{i=1}^n \hat{e}(g_1, g_2)^{(\alpha+\beta)\xi\eta(x_i-x'_i)^2} \cdot \hat{e}(g_1, g_2)^{-(\alpha+\beta)(r-r')^2\mu_i^2}$$

$$= h^{\Sigma_{i=1}^n (x_i-x'_i)^2}$$

which is the desired result.

The second scheme may be described by the following steps.

First, define a Setup $(1^K,n)$ algorithm. On input security parameter $1^K$, the Setup $(1^K,n)$ algorithm generates the tuple $(\mathbb{G}, \mathbb{G}_T, \hat{e})$ where $\mathbb{G}=\langle g \rangle$ and $\mathbb{G}_T$ are (multiplicatively written) groups whose order is $|\mathbb{G}|=|\mathbb{G}_T|=p$ with p prime, and $\hat{e}: \mathbb{G} \times \mathbb{G} \to \mathbb{G}_T$ is a bilinear pairing. The message space $\mathcal{M}$ is a subset of $(\mathbb{Z}_p)^n$. The Setup $(1^K,n)$ algorithm also selects n+6 elements $\alpha,\beta,\gamma,\delta,\xi,\eta,\mu_1,\ldots,\mu_n \in \mathbb{Z}_p$ such that:

$$(1+\alpha^2+\gamma^2)\xi^2 + (1+\beta^2+\delta^2)\eta^2 \not\equiv 0 \pmod{p}; \text{ and}$$

$$\Sigma_{i=1}^n \mu_i^2 \equiv 0 \pmod{p}.$$

The Setup $(1^K,n)$ algorithm defines $h=\hat{e}(g,g)^{(1+\alpha^2+\gamma^2)\xi^2+(1+\beta^2+\delta^2)\eta^2} \in \mathbb{G}_T$. Finally, the Setup $(1^K,n)$ algorithm selects a pseudo-random function family, $F_K:\{0,1\}^* \times \{1,\ldots,n\} \to \mathbb{Z}_p$, indexed by a secret key and randomly chooses $$K \stackrel{\$}{\leftarrow} KeyGen(1^K).$$

The public parameters are $pp=(\hat{e},\mathbb{G},\mathbb{G}_T,p,h)$ and the secret key is $sk=(g,\alpha,\beta,\gamma,\delta,\xi,\eta,\{\mu_i\}_{1\leq i \leq n},F_K,K)$. This is the public key and the private key.

Next, define a Enc $(sk,\vec{x},\tau)$ algorithm. The encryption of message $\vec{x}=(x_1,\ldots,x_n)\in \mathcal{M}$ with tag $\tau$ is obtained in two steps as:
1) choose uniformly at random $$r \stackrel{\$}{\leftarrow} \mathbb{Z}_p;$$

and 2) for $1\leq i \leq n$, compute $t_i=F_K(\tau,i)$ and $$\begin{cases} c_{i,1} = g^{\xi(x_i+t_i)-(\alpha\delta-\beta\gamma)r\mu_i}, & c_{i,2} = g^{\eta(x_i+t_i)-*(\alpha\delta-\beta\gamma)r\mu_i}, \\ c_{i,3} = g^{\alpha\xi(x_i+t_i)+(\gamma+\delta)r\mu_i}, & c_{i,4} = g^{-\beta\eta(x_i+t_i)+(\gamma+\delta)r\mu_i}, \\ c_{i,5} = g^{-\gamma\xi(x_i+t_i)+(\alpha-\beta)r\mu_i}, & c_{i,6} = g^{\delta\eta(x_i+t_i)+(\alpha+\beta)r\mu_i}, \end{cases}$$

The ciphertext is $\mathfrak{C}=(C,\tau)$ with $C=(c_{1,1},c_{1,2},c_{1,3},c_{1,4},c_{1,5},c_{1,6},\ldots,c_{n,1},c_{n,2},c_{n,3},c_{n,4},c_{n,5},c_{n,6})\in (\mathbb{G})^{6n}$.

Finally, define an Eval $(pp,\mathfrak{C},\mathfrak{C}')$ algorithm. The Eval $(pp,\mathfrak{C},\mathfrak{C}')$ algorithm parses $\mathfrak{C}$ as $((c_{1,1},c_{1,2},c_{1,3},c_{1,4},c_{1,5},c_{1,6},\ldots,c_{n,1},c_{n,2},c_{n,3},c_{n,4},c_{n,5},c_{n,6}),\tau)$ and $\mathfrak{C}'$ as $((c'_{1,1},c'_{1,2},c'_{1,3},c'_{1,4},c'_{1,5},c'_{1,6},\ldots,c'_{n,1},c'_{n,2},c'_{n,3},c'_{n,4},c'_{n,5},c'_{n,6}),\tau')$.

If $\tau'\neq\tau$, the Eval $(pp,\mathfrak{C},\mathfrak{C}')$ algorithm returns $\bot$. Otherwise, if $\tau'=\tau$, it evaluates the product $$Z := \prod_{i=1}^{n} \prod_{j=1}^{6} \hat{e}\left(\frac{c_{i,j}}{c'_{i,j}}, \frac{c_{i,j}}{c'_{i,j}}\right) = h^{\sum_{i=1}^{n}(x_i-x'_i)^2}.$$

The Eval $(pp,\mathfrak{C},\mathfrak{C}')$ algorithm then obtains $\Sigma_{i=1}^{n}(x_1-x'_i)^2$ (mod p) as the discrete logarithm of Z with respect to base h in $\mathbb{G}_T$.

The correctness of the Eval $(pp,\mathfrak{C},\mathfrak{C}')$ algorithm is easily verified. From $$\begin{cases} \frac{c_{i,1}}{c'_{i,1}} = g^{\xi(x_i-x'_i)-(\alpha\delta-\beta\gamma)(r-r')\mu_i}, & \frac{c_{i,2}}{c'_{i,2}} = g^{\eta(x_i-x'_i)-(\alpha\delta-\beta\gamma)(r-r')\mu_i}, \\ \frac{c_{i,3}}{c'_{i,3}} = g^{\alpha\xi(x_i-x'_i)+(\gamma+\delta)(r-r')\mu_i}, & \frac{c_{i,4}}{c'_{i,4}} = g^{-\beta\eta(x_i-x'_i)+(\gamma+\delta)(r-r')\mu_i}, \\ \frac{c_{i,5}}{c'_{i,5}} = g^{-\gamma\xi(x_i-x'_i)+(\alpha+\beta)(r-r')\mu_i}, & \frac{c_{i,6}}{c'_{i,6}} = g^{\delta\beta(x_i-x'_i)+(\alpha+\beta)(r-r')\mu_i}. \end{cases}$$

the following results:

$$\prod_{j=1}^{6} \hat{e}\left(\frac{c_{i,j}}{c'_{i,j}}, \frac{c_{i,j}}{c'_{i,j}}\right) = \hat{e}(g,g)^{[\xi(x_i-x'_i)-(\alpha\delta-\beta\gamma)(r-r')\mu_i]^2} \cdot \hat{e}(g,g)^{[\eta(x_i-x'_i)-(\alpha\delta-\beta\gamma)(r-r')\mu_i]^2} \cdot$$

$$\hat{e}(g,g)^{[\alpha\xi(x_i-x'_i)+(\gamma3\ \delta)(r-r')\mu_i]^2} \cdot \hat{e}(g,g)^{[-\beta\eta(x_i-x'_i)+(\gamma+\delta)(r-r')\mu_i]^2} \cdot$$

$$\hat{e}(g,g)^{[-\gamma\xi(x_i-x'_i)+(\alpha+\beta)(r-r')\mu_i]^2} \cdot \hat{e}(g,g)^{[\delta\eta(x_i-x'_i)+(\alpha+\beta)(r-r')\mu_i]^2}$$

$$= \hat{e}(g,g)^{[\xi^2+\eta^2+(\alpha\xi)^2+(\beta\eta)^2+(\gamma\xi)^2+(\beta\eta)^2](x_i-x'_i)^2+2[(\alpha\delta-\beta\gamma)^2+(\gamma+\beta)^2+(\alpha+\beta)^2](r-r')^2\mu_i^2}.$$

As a result, the following is obtained:

$$Z := \prod_{i=1}^{n} \prod_{j=1}^{6} \hat{e}\left(\frac{c_{i,j}}{c'_{i,j}}, \frac{c_{i,j}}{c'_{i,j}}\right)$$
$$= h^{\sum_{i=1}^{n}(x_i-x'_i)^2}$$

which is the desired result.

The embodiments described above may be used in various applications. For example, in privacy-preserving applications, the evaluation of distance between two vectors serves many different applications. Two categories are focused on: (i) evaluation of distance between two vectors for machine learning algorithms; and (ii) evaluation of physical proximity.

First, application of the embodiments to machine learning will be described. Very large sample sets can require a lot of storage and computational resources in order to carry out the algorithm. In order to be able to handle large datasets, the computation will be offloaded to a datacenter such a cloud computing platform. However, the raw data or feature vectors can often constitute a valuable training set that cannot be released due to privacy concerns, financial value, etc. Therefore machine learning on the data should be performed without actually exposing the data to the server.

Many useful machine learning algorithms for clustering and classification of data use the distance between datapoints or the feature vectors extracted from the data. These include known spectral clustering and classification methods. For instance the Gaussian kernel may be applied with the form $$e^{-\frac{\|\vec{x}-\vec{y}\|^2}{2\sigma^2}}$$

to separate points lying on concentric circles using a linear classifier.

Distances are used to calculate adjacency matrices which are used to compute Laplacian or diffusion matrices. The spectral decomposition of these matrices and choice of the eigenvectors corresponding to the largest eigenvalues result in an often useful non-linear dimensionality reduction of the data. Non-linear dimensionality reduction has been successfully applied to such tasks as computer vision, image classification and segmentation, speaker identification and verification, anomaly detection, etc.

Second, application of the embodiments to private evaluation of geo-proximity will be described. A central service is proposed that users may enroll in to get notifications when they are in proximity to a friend, similar to features supported nowadays by social networks. Two users $U_i$ and $U_j$, who are interested in discovering when they are near one another, enroll in the service after generating a shared key. They occasionally submit their coordinates to the server, encrypted using the schemes described above, using the pre-shared key and a common tag. The pseudo random function used to generate the common tag may incorporate the time in order to prevent evaluating the distance with a prior location ciphertext.

The server evaluates distances for all pairs i,j that share a common tag, and notifies users whose distance from one another is below a specified threshold. Such a service eliminates the need to broadcast location to all social contacts, and instead just send it to the server.

Next, application of the embodiments to two-factor biometric and digital authentication is described. It is proposed to use distance evaluation for fuzzy-matching of biometric credentials. Biometric patterns matching has to allow for small mismatches due to the fuzzy nature of biometric credentials. The matching of biometric credentials therefore measures whether the distance between the stored reference pattern, and the reading is below a certain predefined threshold.

Due to the sensitivity of biometric credentials, it is desirable to avoid storing the biometric credentials in the clear in a central database. A biometric authentication system may include a central service with a database that stores encrypted biometric credentials, smart-IDs (electronic tokens) distributed to users, and biometric readers. An important point is that the biometric readers do not store any data in the clear, but rather encrypt it using encryption keys provided by the smart-IDs.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a server for performing distance revealing encryption, comprising:

generating a tuple $(\mathbb{G}_1, \mathbb{G}_2, \mathbb{G}_T, \hat{e})$, where $\mathbb{G}_1 = \langle g_1 \rangle$, $\mathbb{G}_2 = \langle g_2 \rangle$ and $\mathbb{G}_T$ are groups whose order is $|\mathbb{G}_1| = |\mathbb{G}_2| = |\mathbb{G}_T| = p$ with p prime and $\hat{e}: \mathbb{G}_1 \times \mathbb{G}_2 \to \mathbb{G}_T$ is a bilinear pairing and is non-degenerate;

randomly select a first plurality of elements and a second plurality of elements, wherein the first plurality of elements are $\alpha, \beta, \xi, \eta$ and are selected such that $(\alpha+\beta)\xi\eta \not\equiv 0 \pmod{p}$, and wherein the second plurality of elements are $\mu_1, \ldots, \mu_n$ and are selected such that $\sum_{i=1}^{n} \mu_i \equiv 0 \pmod{p}$;

defining a parameter h that is based upon $\hat{e}, g_1, g_2$, and the first plurality of elements, wherein the parameter $h = \hat{e}(g_1, g_2)^{(\alpha+\beta)\xi\eta}$;

selecting a pseudo-random function family indexed by a secret key K;

setting public parameters as $\hat{e}, \mathbb{G}_1, \mathbb{G}_2, \mathbb{G}_T, p, h$;

setting private parameters as $g_1, g_2$, the first plurality of elements, the second plurality of elements, the pseudo-random function family, and the secret key K;

encrypting a message $\vec{x} = (x_1, \ldots, x_n)$, when n is the number of components in the message by:

choosing a random value r;

computing a plurality of values of the pseudo random function family; and computing a first plurality of ciphertext values based upon $g_1$, the random value r, the first plurality of elements, the second plurality of elements, the plurality of values of the pseudo random function, and message $\vec{x}$; and computing a second plurality of ciphertext values based upon $g_2$, the random value r, the first plurality of elements, the second plurality of elements, the plurality of values of the pseudo random function, and message $\vec{x}$, wherein the server evaluates distances and notifies users whose distance from one another is below a specified threshold.

2. The method of claim 1, wherein the first plurality of ciphertext values are calculated as $c_{i,1} = g_1^{\xi(x_i+t_i)+r\mu_i}$ and $c_{i,2} = g_1^{\alpha(x_i+t_i)-\beta r\mu_i}$ for $1 \leq i \leq n$, where $t_i$ are the plurality of values of the pseudo random function, and the second plurality of ciphertext values are calculated as $d_{i,1} = g_2^{\beta\eta(x_i+t_i)-\alpha r\mu_i}$ and $d_{i,2} = g_2^{\eta(x_i+t_i)+r\mu_i}$ for $1 \leq i \leq n$.

3. The method of claim 2, wherein $t_i = F_K(\tau, i)$ where tag $\tau$ is a value associated with the message $\vec{x}$.

4. The method of claim 2, further comprising determining the distance between two encrypted messages $\vec{x}$ and $\vec{x}'$ by calculating:

$$Z := \Pi_{i=1}^{n} \hat{e}\left(\frac{c_{i,1}}{c'_{i,1}}, \frac{d_{i,1}}{d'_{i,1}}\right) \cdot \hat{e}\left(\frac{c_{i,2}}{c'_{i,2}}, \frac{d_{i,2}}{d'_{i,2}}\right).$$

5. A method performed by a server for performing distance revealing encryption, comprising:
   generating a tuple ($\mathbb{G}$, $\mathbb{G}_T$, $\hat{e}$), where $\mathbb{G} = \mathbb{G}g\mathbb{G}$ and $\mathbb{G}_T$ are groups whose order is $|\mathbb{G}| = |\mathbb{G}_T| = p$ with $p$ prime and $\hat{e}: \mathbb{G} \times \mathbb{G} \to \mathbb{G}_T$ is a bilinear pairing and is non-degenerate;
   randomly select a first plurality elements and a second plurality of elements, wherein the first plurality of elements are $\alpha, \beta, \gamma, \delta, \xi, \eta$ and are selected such that $(1+\alpha^2+\gamma^2)\xi^2+(1+\beta^2+\delta^2)\eta^2 \not\equiv 0 \pmod{p}$, and the second plurality of elements are $\mu_1, \ldots, \mu_n$ and are selected such that $\Sigma_{i=1}^{n}\mu_i^2 \not\equiv 0 \pmod{p}$;
   defining a parameter $h$ that is based upon $\vec{e}$, $g$, and the first plurality of elements, wherein the parameter $h = \hat{e}(g,g)^{(1+\alpha^2+\gamma^2)\xi^2+(1+\beta^2+\delta^2)\eta^2}$;
   selecting a pseudo-random function family indexed by a secret key K;
   setting public parameters as $\hat{e}$, $\mathbb{G}$, $\mathbb{G}_T$, p, h,
   setting private parameters as g, the first plurality of elements, the second plurality of elements, the pseudo-random function family, and the secret key K;
   encrypting a message $\vec{x} = (x_1, \ldots, x_n)$, when n is the number of elements in the message by:
      choosing a random value r;
      computing a plurality of values of the pseudo random function; and
      computing a plurality of ciphertext values based upon g, the random value r, the first plurality of elements, the second plurality of elements, the plurality of values of the pseudo random function, and message $\vec{x}$, wherein the server evaluates distances and notifies users whose distance from one another is below a specified threshold.

6. The method of claim 5, wherein
   the plurality of ciphertext values are calculated as $c_{i,1} = g^{\xi(x_i+t_i)-(\alpha\delta-\beta\gamma)r\mu_i}$, $c_{i,2} = g^{\eta(x_i+t_i)-(\alpha\delta-\beta\gamma)r\mu_i}$, $c_{i,3} = g^{\alpha\xi(x_i+t_i)+(\gamma+\delta)r\mu_i}$, $c_{i,4} = g^{-\beta\eta(x_i+t_i)+(\gamma+\delta)r\mu_i}$, $c_{i,5} = g^{-\gamma\xi(x_i+t_i)+(\alpha+\beta)r\mu_i}$, and $c_{i,6} = g^{\delta\eta(x_i+t_i)+(\alpha+\beta)r\mu_i}$ for $1 \leq i \leq n$, where $t_i$ are the plurality of values of the pseudo random function.

7. The method of claim 6, wherein $t_i = F_K(\tau, i)$ where tag $\tau$ is a value associated with the message $\vec{x}$.

8. The method of claim 6, further comprising determining the distance between two encrypted messages $\vec{x}$ and $\vec{x}'$ by calculating:

$$Z := \Pi_{i=1}^{n} \Pi_{j=1}^{6} \hat{e}\left(\frac{c_{i,j}}{c'_{i,j}}, \frac{c_{i,j}}{c'_{i,j}}\right).$$

9. A non-transitory machine-readable storage medium encoded with instructions, that when executed by a processor, perform a distance revealing encryption, comprising:
   instructions for generating a tuple ($\mathbb{G}z$, $\mathbb{G}_2$, $\mathbb{G}_T$, $\vec{e}$), where $\mathbb{G}_z = \mathbb{G}g_1\mathbb{G}$, $\mathbb{G}_2 = \mathbb{G}g_2\mathbb{G}$ and $\mathbb{G}_T$ are groups whose order is $|\mathbb{G}_1| = |\mathbb{G}_2| = |\mathbb{G}_T| = p$ with p prime and $\vec{e}: \mathbb{G}_1 \times \mathbb{G}_2 \to \mathbb{G}_T$ is a bilinear pairing and is non-degenerate;
   instructions for randomly select a first plurality elements and a second plurality of elements, wherein the first plurality of elements are $\alpha, \beta, \xi, \eta$ and are selected such that $(\alpha+\beta)\xi\eta \not\equiv 0 \pmod{p}$, and wherein the second plurality of elements are $\mu_1, \ldots, \mu_n$ and are selected such that $\Sigma_{i=1}^{n}\mu_i^2 \not\equiv 0 \pmod{p}$;
   instructions for defining a parameter h that is based upon $\vec{e}$, $\mathbb{G}_1$, $\mathbb{G}_2$, and the first plurality of elements, wherein the parameter $h = \vec{e}(g_1, g_2)^{(\alpha+\beta)\mu\eta}$;
   instructions for selecting a pseudo-random function family indexed by a secret key K;
   instructions for setting public parameters as $\vec{e}$, $\mathbb{G}_1$, $\mathbb{G}_2$, $\mathbb{G}_T$, p, h;
   instructions for setting private parameters as $g_1$, $g_2$, the first plurality of elements, the second plurality of elements, the pseudo-random function family, and the secret key K;
   instructions for encrypting a message $\vec{x} = (x_1, \ldots, x_n)$, when n is the number of components in the message by:
      choosing a random value r;
      computing a plurality of values of the pseudo random function; and
      computing a first plurality of ciphertext values based upon $g_1$, the random value r, the first plurality of elements, the second plurality of elements, the plurality of values of the pseudo random function, and message $\vec{x}$; and
      computing a second plurality of ciphertext values based upon $g_2$, the random value r, the first plurality of elements, the second plurality of elements, the plurality of values of the pseudo random function, and message $\vec{x}$, wherein only a distance between plaintext messages can be inferred from corresponding ciphertext values of the first and second plurality of ciphertext values.

10. The non-transitory machine-readable storage medium of claim 9, wherein
   the first plurality of ciphertext values are calculated as $c_{i,1} = g_1^{\xi(x_i+t_i)r\mu_i}$ and $c_{i,2} = g_1^{\alpha(x_i+t_i)-\beta r\mu_i}$ for $1 \leq i \leq n$, where $t_i$ are the plurality of values of the pseudo random function, and
   the second plurality of ciphertext values are calculated as $d_{i,1} = g_2^{\beta\eta(x_i+t_i)-\alpha r\mu_i}$ and $d_{i,2} = q_2^{\eta(x_i+t_i)+r\mu_i}$ for $1 \leq i \leq n$.

11. The non-transitory machine-readable storage medium of claim 10, wherein $t_i = F_K(\tau, i)$ where tag $\tau$ is a value associated with the message $\vec{x}$.

12. The non-transitory machine-readable storage medium of claim 10, further comprising determining the distance between two encrypted messages $\vec{x}$ and $\vec{x}'$ by calculating:

$$Z := \Pi_{i=1}^{n} \hat{e}\left(\frac{c_{i,1}}{c'_{i,1}}, \frac{d_{i,1}}{d'_{i,1}}\right) \cdot \hat{e}\left(\frac{c_{i,2}}{c'_{i,2}}, \frac{d_{i,2}}{d'_{i,2}}\right).$$

13. A non-transitory machine-readable storage medium encoded with, that when executed by a processor, perform a distance revealing encryption, comprising:
   instructions for generating a tuple ($\mathbb{G}$, $\mathbb{G}_T$, $\hat{e}$), where $\mathbb{G} = \mathbb{G}g\mathbb{G}$ and $\mathbb{G}_T$ are groups whose order is $|\mathbb{G}| = |\mathbb{G}_T| = p$ with p prime and $\hat{e}: \mathbb{G} \times \mathbb{G} \to \mathbb{G}_T$ is a bilinear pairing and is non-degenerate;

instructions for randomly select a first plurality of elements and a second plurality of elements, wherein the first plurality of elements are $\alpha$, $\beta$, $\gamma$, $\delta$, $\xi$, $\eta$ and are selected such that $(1+\alpha^2+\gamma^2)\tau^2+(1+\beta^2+\delta^2)\partial^2 \not\equiv 0 \pmod{p}$, and wherein the second plurality of elements are $\mu_1, \ldots, \mu_n$ and are selected such that $\Sigma_{i=1}^n \mu_i^2 \not\equiv 0 \pmod{p}$;

instructions for defining a parameter h that is based upon $\hat{e}$, g, and the first plurality of elements, wherein the parameter $h = \vec{e}(g,g)^{(1+\alpha^2+\gamma^2)\xi^2+(1+\beta^2+\delta^2)\eta^2}$;

instructions for selecting a pseudo-random function family indexed by a secret key K;

instructions for setting public parameters as $\vec{e}$, $\mathbb{G}$, $\mathbb{G}_T$, p, h, instructions for setting private parameters as g, the first plurality of elements, the second plurality of elements, the pseudo-random function family, and the secret key K;

instructions for encrypting a message $\vec{x}=(x_1, \ldots, x_n)$, when n is the number of elements in the message by:
choosing a random value r;
computing a plurality of values of the pseudo random function; and
computing a plurality of ciphertext values based upon g, the random value r, the first plurality of elements, the second plurality of elements, the plurality of values of the pseudo random function, and message $\vec{x}$, wherein only a distance between plaintext messages can be inferred from corresponding ciphertext values of the first and second plurality of ciphertext values.

14. The non-transitory machine-readable storage medium of claim 13, wherein
the plurality of ciphertext values are calculated as $c_{i,1} = g^{\xi(x_i+t_i)-(\alpha\delta-\beta\gamma)r\mu_i}$, $c_{i,2} = g^{\eta(x_i+t_i)-(\alpha\delta-\beta\gamma)r\mu_i}$, $c_{i,3} = g^{\alpha\xi(x_i+t_i)+(\gamma+\delta)r\mu_i}$, $c_{i,4} = g^{-\beta\eta(x_i+t_i)+(\gamma+\delta)r\mu_i}$, $c_{i,5} = g^{-\gamma\xi(x_i+t_i)+(\alpha+\beta)r\mu_i}$, and $c_{i,6} = g^{\delta\eta(x_i+t_i)+(\alpha+\beta)r\mu_i}$ for $1 \le i \le n$, where $t_i$ are the plurality of values of the pseudo random function.

15. The non-transitory machine-readable storage medium of claim 14, wherein $t_i = F_K(\tau, i)$ where tag r is a value associated with the message $\vec{x}$.

16. The non-transitory machine-readable storage medium of claim 14, further comprising determining the distance between two encrypted messages $\vec{x}$ and $\vec{x}'$ by calculating:

$$Z := \Pi_{i=1}^n \Pi_{j=1}^6 \hat{e}\left(\frac{c_{i,j}}{c'_{i,j}}, \frac{c_{i,j}}{c'_{i,j}}\right).$$

* * * * *